United States Patent
Pratt et al.

(10) Patent No.: US 7,255,376 B2
(45) Date of Patent: *Aug. 14, 2007

(54) PRESSURE SENSING DEAD BOLT

(75) Inventors: John D Pratt, Laguna Niguel, CA (US); Timothy S. Rozema, Ladera Ranch, CA (US)

(73) Assignee: Hartwell Corporation, Placentia, CA (US)

( * ) Notice: Subject to any disclaimer, the term of this patent is extended or adjusted under 35 U.S.C. 154(b) by 256 days.

This patent is subject to a terminal disclaimer.

(21) Appl. No.: 10/491,977

(22) PCT Filed: Oct. 4, 2002

(86) PCT No.: PCT/US02/31911

§ 371 (c)(1),
(2), (4) Date: Jul. 13, 2004

(87) PCT Pub. No.: WO03/029585

PCT Pub. Date: Apr. 10, 2003

(65) Prior Publication Data

US 2004/0239126 A1 Dec. 2, 2004
US 2007/0164572 A9 Jul. 19, 2007

Related U.S. Application Data

(60) Provisional application No. 60/326,943, filed on Oct. 4, 2001.

(51) Int. Cl.
*E05C 3/06* (2006.01)
(52) U.S. Cl. .................. 292/201; 244/129.4; 244/129.5
(58) Field of Classification Search ............... 292/144, 292/201; 244/129.4, 129.5, 129.1
See application file for complete search history.

(56) References Cited

U.S. PATENT DOCUMENTS

| 1,950,387 | A |   | 3/1934  | Fischer      |         |
|-----------|---|---|---------|--------------|---------|
| 2,156,387 | A |   | 5/1939  | Goldfinger   |         |
| 2,606,052 | A |   | 8/1952  | Soreng et al.|         |
| 2,774,116 | A |   | 12/1956 | Wolverton    |         |
| 3,426,694 | A | * | 2/1969  | Marsh        | 418/186 |
| 3,426,984 | A |   | 2/1969  | Emmons       |         |
| 3,453,777 | A | * | 7/1969  | Reilly       | 49/141  |
| 3,559,559 | A |   | 2/1971  | Owen et al.  |         |

(Continued)

FOREIGN PATENT DOCUMENTS

JP         2001-10591         1/2001

OTHER PUBLICATIONS

Adams Rite Aerospace: Cockpit Security Program Update. Memo. Feb. 1, 2002.
"Aircraft Security Enhancements", Airbus Technical Digest, pp. 1-22, Dec. 2002.

*Primary Examiner*—Gary Estremsky
(74) *Attorney, Agent, or Firm*—Barnes & Thornburg LLP

(57) ABSTRACT

An apparatus, system and method including a latching device for displaceably retaining a panel relative to a frame. The latching device includes at least a bolt which is carried on the latching device and is operatively associated with the panel to prevent disengagement of the panel. The latching device includes at least one pressure responsive device operatively coupled to the bolt to retain the bolt in a desired position and release the bolt when a predetermined pressure differential occurs relative to two, generally opposite, sides of the panel or when a pressure decrease occurs on one side of the panel.

38 Claims, 8 Drawing Sheets

U.S. PATENT DOCUMENTS

| | | | |
|---|---|---|---|
| 3,571,977 A * | 3/1971 | Abeel | 49/379 |
| 3,638,984 A | 2/1972 | Davidson | |
| 3,658,277 A | 4/1972 | Anderson | |
| 3,680,499 A | 8/1972 | Boudreau | |
| 3,704,845 A | 12/1972 | Ord | |
| 3,738,681 A | 6/1973 | Wada et al. | |
| 3,753,316 A | 8/1973 | Savarieau et al. | |
| 3,811,643 A | 5/1974 | Pizzo | |
| 3,829,138 A | 8/1974 | Morita | |
| 3,841,328 A | 10/1974 | Jensen | |
| 3,861,727 A | 1/1975 | Froerup et al. | |
| 3,938,764 A | 2/1976 | McIntyre et al. | |
| 3,981,302 A * | 9/1976 | Veit | 128/202.26 |
| 4,042,193 A | 8/1977 | Cerne | |
| 4,048,756 A | 9/1977 | Lawrence | |
| 4,049,221 A | 9/1977 | Fountain | |
| 4,126,341 A | 11/1978 | Bradstock | |
| 4,164,899 A | 8/1979 | Burgess | |
| 4,230,352 A * | 10/1980 | Sealey et al. | 292/341.17 |
| 4,351,501 A | 9/1982 | Peash et al. | |
| 4,383,666 A | 5/1983 | Allerding et al. | |
| 4,390,152 A | 6/1983 | Jorgensen | |
| 4,432,514 A | 2/1984 | Brandon | |
| 4,522,359 A | 6/1985 | Church et al. | |
| 4,543,889 A * | 10/1985 | Fritz | 105/377.08 |
| 4,552,326 A * | 11/1985 | Bokalot | 244/129.5 |
| 4,575,136 A * | 3/1986 | Keller | 292/33 |
| 4,681,286 A | 7/1987 | Church et al. | |
| RE32,554 E | 12/1987 | Murphy | |
| 4,720,065 A | 1/1988 | Hamatani | |
| 4,756,566 A | 7/1988 | Logas | |
| 4,915,326 A * | 4/1990 | Plude | 244/129.5 |
| 4,917,425 A | 4/1990 | Logas | |
| 4,986,584 A | 1/1991 | Logas | |
| 5,046,686 A | 9/1991 | Carla et al. | |
| 5,118,053 A | 6/1992 | Singh et al. | |
| 5,118,150 A | 6/1992 | Jarrett | |
| 5,163,639 A | 11/1992 | Herrmann et al. | |
| 5,180,121 A | 1/1993 | Banks et al. | |
| 5,251,851 A | 10/1993 | Herrmann et al. | |
| 5,273,486 A | 12/1993 | Emmons et al. | |
| 5,275,361 A * | 1/1994 | Fray | 244/129.1 |
| 5,289,615 A | 3/1994 | Banks et al. | |
| 5,305,969 A | 4/1994 | Odell et al. | |
| 5,337,977 A | 8/1994 | Fleming et al. | |
| 5,379,971 A | 1/1995 | Kim et al. | |
| 5,480,109 A | 1/1996 | Klein et al. | |
| 5,490,699 A | 2/1996 | Uyeda | |
| 5,535,804 A | 7/1996 | Guest | |
| 5,577,781 A * | 11/1996 | Kallies et al. | 292/195 |
| 5,590,852 A | 1/1997 | Olson | |
| 5,667,169 A | 9/1997 | Erben et al. | |
| 5,765,883 A | 6/1998 | Dessenberger et al. | |
| 5,782,511 A | 7/1998 | Schwartz | |
| 5,823,473 A | 10/1998 | Odell et al. | |
| 5,823,608 A | 10/1998 | Tanaka et al. | |
| 5,879,034 A | 3/1999 | Johns | |
| 6,106,032 A * | 8/2000 | Och | 292/207 |
| 6,116,542 A | 9/2000 | Erben | |
| 6,158,692 A | 12/2000 | Abild et al. | |
| 6,168,114 B1 | 1/2001 | Erben | |
| 6,264,141 B1 | 7/2001 | Shim et al. | |
| 6,454,210 B1 | 9/2002 | Plattner | |
| 6,484,449 B1 | 11/2002 | Artsiely | |
| 6,651,932 B2 | 11/2003 | Diehl et al. | |
| 6,669,144 B2 | 12/2003 | Artsiely | |
| 6,745,982 B2 | 6/2004 | Lehmann | |
| 6,866,226 B2 | 3/2005 | Pratt et al. | |
| 6,866,227 B2 | 3/2005 | Pratt et al. | |
| 6,902,137 B2 | 6/2005 | Brzeski et al. | |
| 2002/0014557 A1 | 2/2002 | Erben et al. | |
| 2002/0092951 A1 | 7/2002 | Haviv | |
| 2003/0052227 A1 | 3/2003 | Pittman | |
| 2003/0127563 A1 | 7/2003 | LaConte | |
| 2005/0116100 A1 | 6/2005 | Pratt et al. | |

* cited by examiner

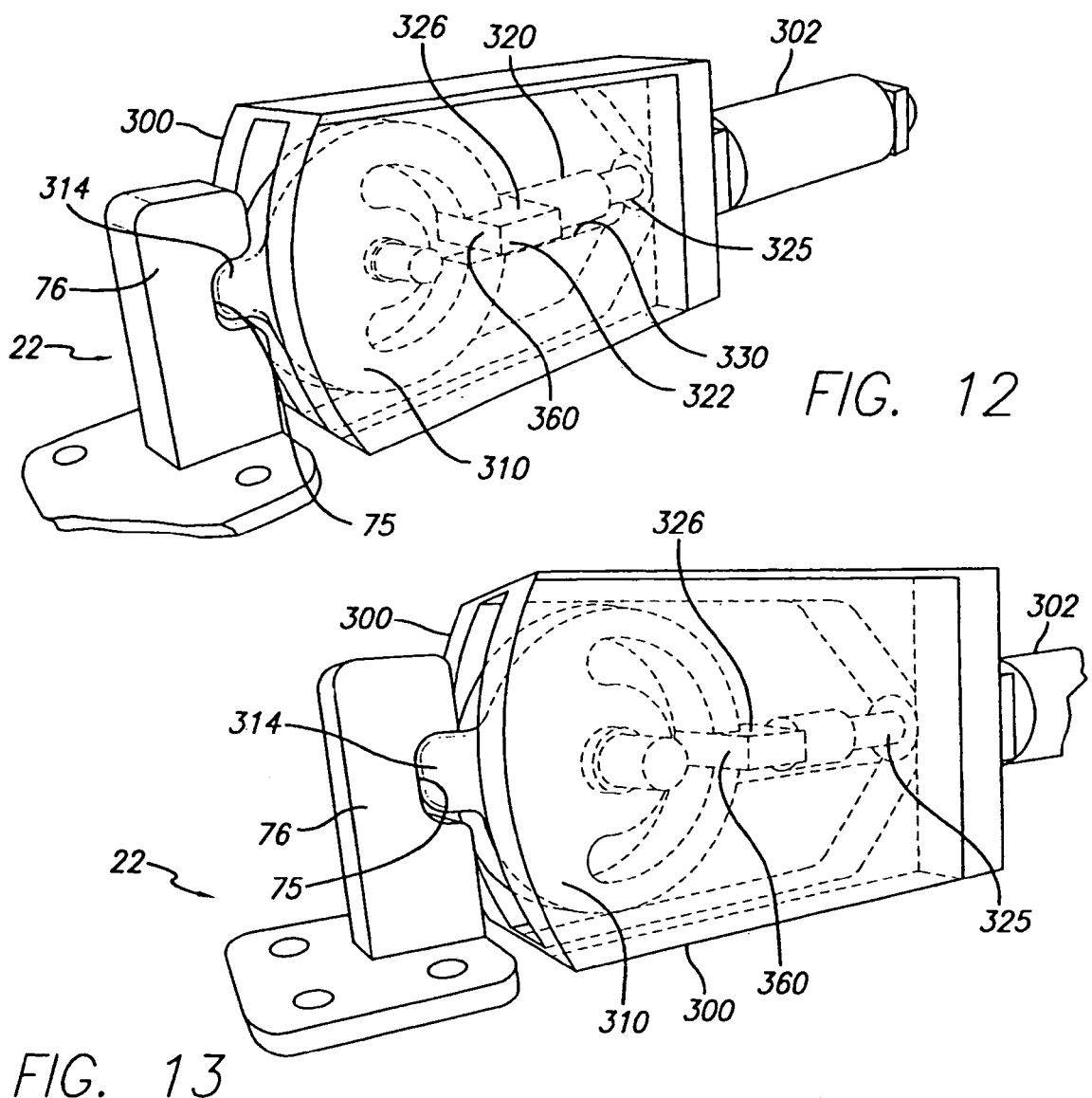
FIG. 12
FIG. 13
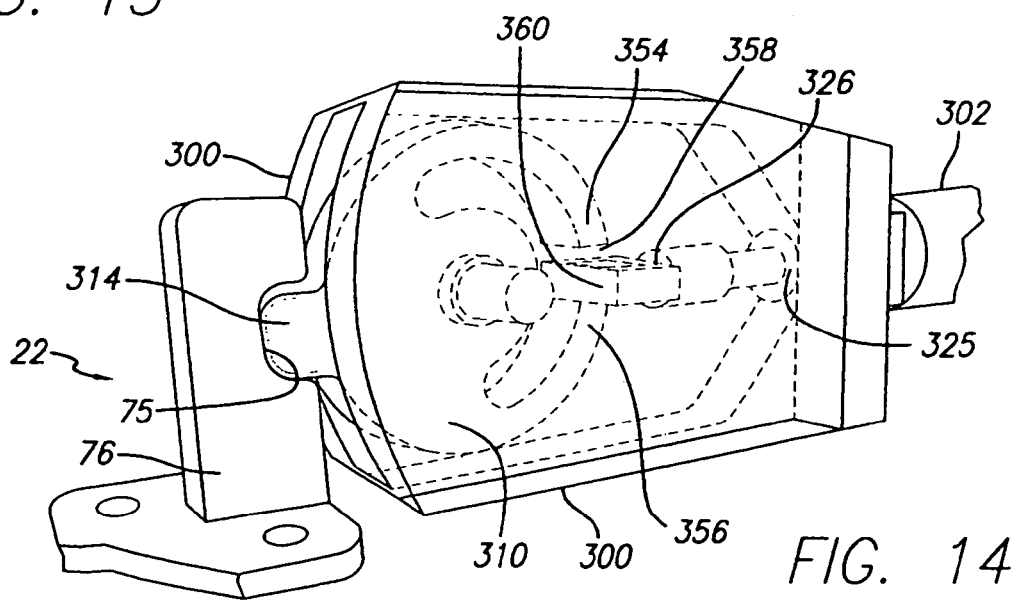
FIG. 14

PRESSURE SENSING DEAD BOLT

This application claims benefit of U.S. Provisional Application No. 60/326,943 filed on Oct. 4, 2001.

BACKGROUND

The present disclosure relates to a method, system and apparatus for a latching device which operates in response to a pressure differential between a first side and a second side of a barrier to allow a panel associated with the barrier to release upon a given set or range of pressure conditions.

By way of review, a variety of latching systems have been developed to maintain doors and other structures in a closed position. The reference to panels, doors and other structures relates to the use of latching devices to retain a first body such as a panel relative to a second body, such as a frame. With regard to the example of panels, a panel includes one portion which might be rotatably hinged or otherwise movably retained on a corresponding structure such as a frame. The panel serves to close or cover at least a portion of an opening defined by the frame for a variety of purposes including providing a barrier to prevent passage through the opening.

A variety of latching devices have been developed to facilitate the movement or "blowout" of a panel relative to the frame. Such blowout latching devices have been developed by Hartwell Corporation, assignee of the present disclosure to facilitate disengagement of a panel from a frame or other structure under a set or range of "blowout" conditions. For example, if pressure builds up within an area at least partially housed or contained by the panel, the pressure differential will rise to a point where the panel may be forcibly removed, disengaged or "blown out" from the frame by force associated with the pressure differential. Under these conditions, it is desirable to set the blowout force at a level or range so that premature disengagement of the panel from the primary structure does not occur. In this situation, the blow out load level can be set so that a predetermined pressure differential disengages the panel from the primary structure to protect and preserve the integrity of the frame and any related structures and devices.

In some situations, it would be desirable to maintain a door in a closed position under one level or range of pressure conditions yet release the door under a second range or set of conditions. Such level or range may or may not overlap or may be discrete ranges or, in fact, points. The panel in such a situation generally is in an environment where the pressure on either side of the door is generally equalized. The door may include a sealing structure to prevent the unwanted or abrupt passage of air there through. However, the pressure on either side of the door is generally equal.

One example of the use of such a panel in a well-known environment is the use of a panel in a pressurized cabin such as in an aircraft. The panel may be employed as a barrier to separate the flight crew, passengers and/or cargo into discrete areas. Such a panel may be used between the flight deck and passenger compartment as well as perhaps between the passenger compartment and corresponding storage area which is not occupied by passengers. In the situation in which the panel is used on an aircraft in which the cabin is pressurized, it may be desirable to maintain the door in a closed position for many situations but allow the panel to be opened when the pressure differential between the two compartments changes. Such a pressure differential may occur in the case where cabin pressure drops in the cargo compartment due to a leak or other loss of pressure. Under these circumstances, it might be desirable to allow the cabin to generally equalize to avoid or minimize damage which might result from the pressure differential.

Similarly, in a situation where a panel is positioned between the flight deck and the passengers, it may be desirable to release the panel and equalize the pressure between the flight deck and passenger area. In the situation in which the panel is positioned between the flight deck and passenger area, it might be desirable to allow the panel to disengage, rather than having the panel structurally fail as a result of the pressure differential.

For example, the panel to the flight deck generally is maintained in a closed and latched position while in flight to maintain privacy of the flight crew. This prevents the passage of passengers into the flight deck area. Increased latching strength is required in order to prevent a passenger from forcibly opening the door. However, in a situation in which pressure is lost in the passenger compartment, it may be desirable to allow the panel to release in order to prevent the panel from being forcibly removed from the structure by the pressure differential. This would help prevent injury to passengers if the panel were forcibly removed from the frame and expelled into the passenger compartment. By allowing the panel to release in response to the pressure differential between the flight deck and passenger compartment, the panel will open thereby providing increased safety. Similarly, if the pressure differential occurs as a result of loss of pressure in the flight deck, the panel will be allowed to disengage the frame, yet be retained thereon, to provide pressure equalization to prevent injury to the flight crew and equipment. Further, a pressure differential on the panel creates forces which could damage the bulkhead to which the panel is attached possibly damaging the associate portion of the airframe. Release of the panel eliminates the forces imposed on the airframe thereby eliminating a possible source of damage to the airframe.

With the foregoing in mind, it would be desirable to provide a method, system and apparatus to provide unlatching of the door latch under a range or set of pressure differential circumstances. The present disclosure seeks to provide an improved, novel latching system which operates in response to a pressure differential.

BRIEF DESCRIPTION OF THE DRAWINGS

The detailed description particularly refers to the accompanying figures in which:

FIGS. 12-18 are perspective views showing operation of the latching mechanism as shown in FIGS. 9-11, FIGS. 12 and 13 showing the mechanism preventing disengagement of a bolt from a keeper, FIGS. 14-16 showing movement of the bolt through a locking structure, FIGS. 17 and 18 showing movement of the bolt upon displacement of the locking structure.

DESCRIPTION OF THE DRAWINGS

Figure 1:
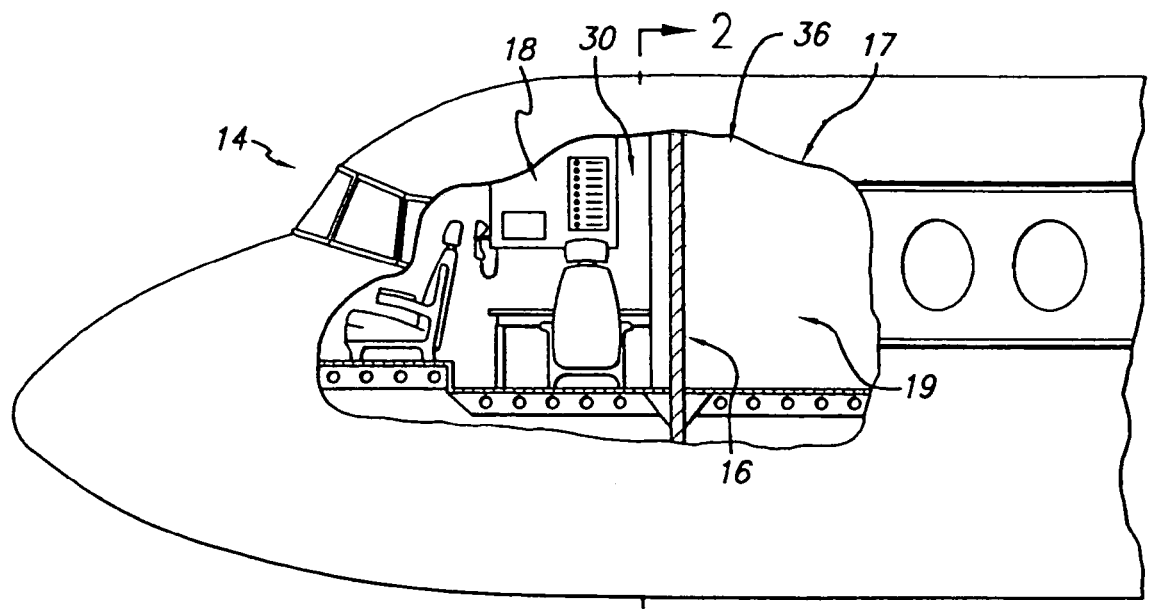
FIG. 1 is a partial fragmentary view of a portion of an aircraft having a barrier which is positioned between a cockpit area and a passenger area.

While the present disclosure may be susceptible to embodiment in different forms, there is shown in the drawings, and herein will be described in detail, embodiments with the understanding that the present description is to be considered an exemplification of the principles of the disclosure and is not intended to limit the disclosure to the details of construction and the arrangements of components set forth in the following description or illustrated in the drawings.

FIG. 1 shows a fragment of a front section of an aircraft 14 in which a portion of the outside of the aircraft 14 has been broken away to illustrate a barrier 16. The barrier 16 divides an internal compartment 17 to separate a flight deck or cockpit area 18 from a passenger area 19. As it will be described in detail herein below, the present disclosure helps to prevent unpermitted access from the passenger compartment 19 to the cockpit 18. Also, the disclosure allows automatic opening of the barrier 16 in the event of depressurization in either the cockpit 18 or passenger compartment 19.

Figure 2:
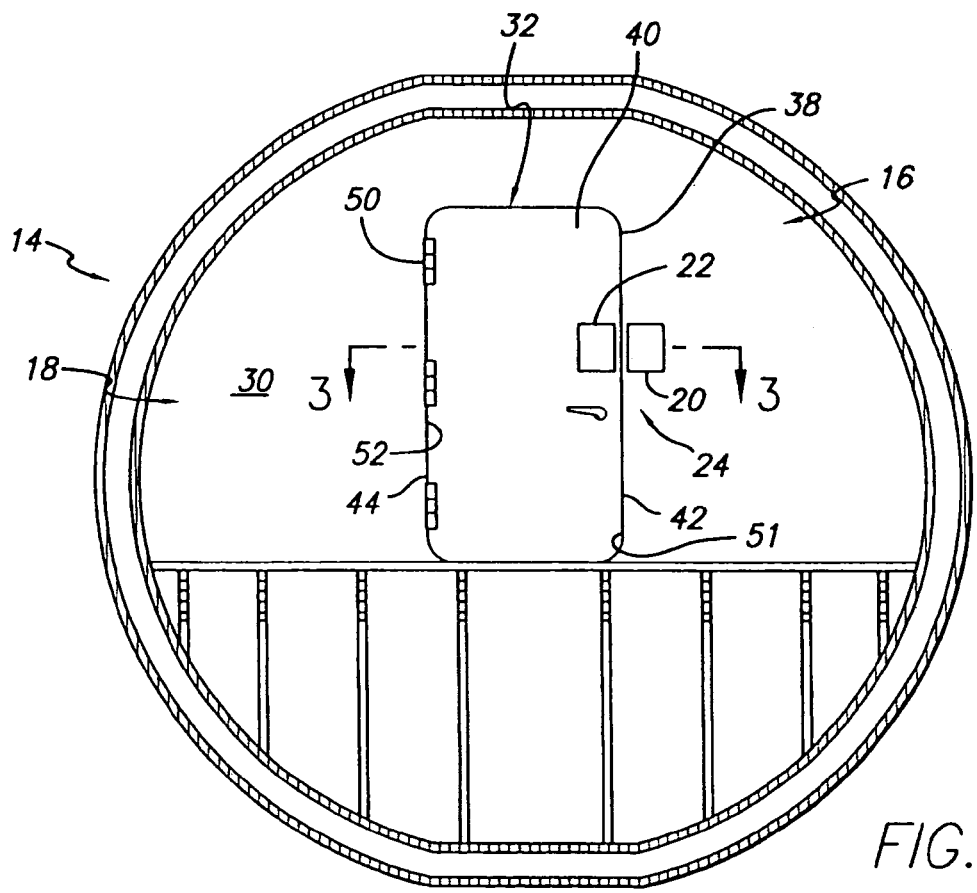
FIG. 2 is a diagrammatic cross-sectional view taken along line 2-2 in FIG. 1 showing a panel in the barrier employing a latching device as disclosed.

FIG. 2 provides a general diagrammatic illustration taken along line 2-2 in FIG. 1 showing a view from the cockpit area 18 facing the barrier 16. As shown generally in FIG. 2, the disclosure includes a first portion 20 and a second portion 22 comprising the latching mechanism 24. In the embodiment shown, the first portion 20 includes a pressure responsive device 26 (FIGS. 3-5) which includes a passage 28 communicating with a volume and associated pressure on a first side 30 (cockpit 18) of a panel assembly 32 and a passage 34 communicating with a volume and associated pressure on a second side 36 (passenger compartment 19) of the panel assembly 32.

The door or panel assembly 32 includes a frame structure 38 and a panel 40. The panel 40 includes a free end 42 and a movably retained end 44. As indicated by the arrows 46, 48, the panel 40 can swing towards the first side 30, the second side 36, or swing between both sides 30, 36. The movement of the panel 40 depends upon the retaining structure 50, such as a hinge structure, which attaches the retained end 44 to a second portion 51 of the frame structure 52. In summary, the free end 42 of the door panel 40 moves relative to the retained end 44 by way of the retaining means 52 to move the panel relative to the second portion 51 of the frame structure 52.

The first and second portions 20, 22 are attached to respective, generally proximate areas on the panel 40 and frame 38. The portions, 20, 22 make up the latching device 24. As will be described in greater detail herein below, the latching device 24 includes a mechanism which selectively engages the portions 20, 22 to providing a resistance force which resists separation of the panel 40 from the corresponding frame 38. In this regard, the panel 40 is retained or locked in position until other pressure related conditions are met. The retaining force is generally illustrated as a mechanical arrangement whereby one mechanism engages a corresponding area to prevent dislodgement of the panel 40 from the frame 38. It is also envisioned the portions 20, 22 making up the latching mechanism 24 may also have a magnetic force such that the magnetic force resists displacement of the door panel 40 relative to the frame 38. As shown in the embodiment of FIGS. 6-13 the mechanism includes a bolt 78 which engages a corresponding second portion the frame 38 of prevent disengagement of the panel 40 from the frame 38.

Figure 5:
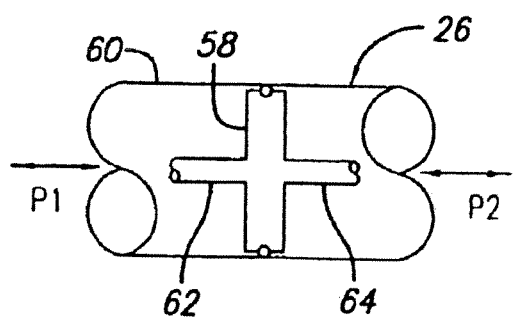
FIG. 5 is an enlarged diagrammatic illustration of a pressure responsive device as employed in the present disclosure.

The device, whether it is mechanical or magnetic is acted on, responsive to, and/or affected or controlled by the pressure detected by or acting on the pressure responsive device 26. The pressure responsive device 26 is embodied in one form as shown in FIG. 5 as a pressure cylinder or pneumatic piston which moves a plunger 58 through the cylinder structure 60. Engaging structures 62, 64 are associated with the latching device 24 to either engage or disengage the corresponding portion 22. The engaging structures 62, 64 are attached to appropriate structures such that when the plunger 58 is moved, the latching device 24 will either engage or disengage to facilitate locking or unlocking of the latching device 24. Further details as to the mechanical latching structures retained in the latching device 24 are provided herein below. Further, the pressure responsive device may be in the form of a diaphragm which is coupled to the latching device 24.

Another form of the pressure responsive device 26 is generally responsive to pressure on one side of the device. In this regard, this form of the device 26 may or may not communicate with both sides of the panel. In this embodiment, a dramatic, sudden change in pressure will cause a rapid shift in the output of the output of the pressure responsive device 26 causing the desired pressure responsive effect on the latching mechanism. Such a change in pressure is generally so large on one side of the panel that the pressure change on the other side of the panel is negligible. Such a pressure change might occur rapid in a decompression event.

Figure 3:
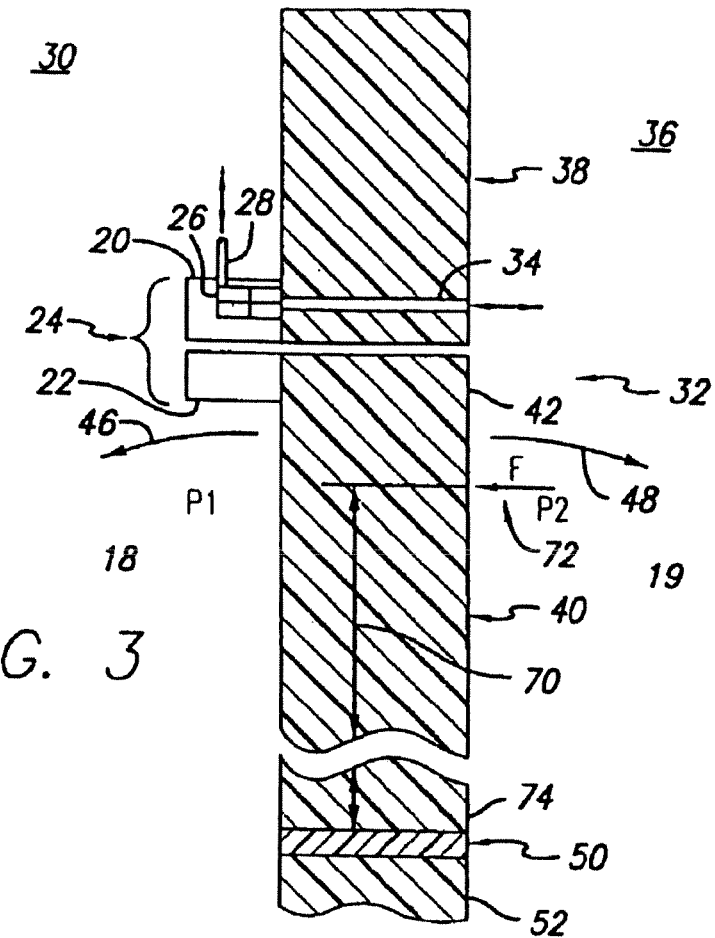
FIG. 3 is a diagrammatic cross-sectional view taken along line 3-3 in FIG. 2.
Figure 4:
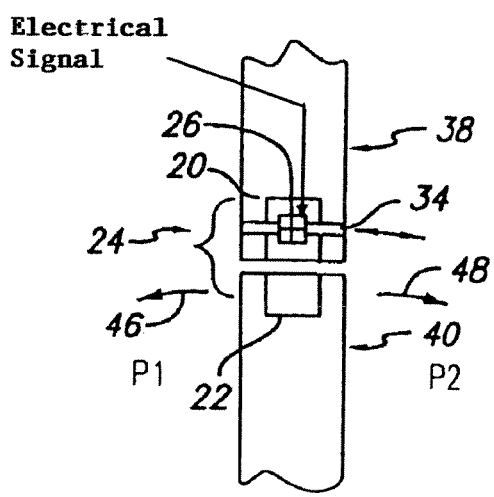
FIG. 4 is a cross-sectional view similar to that as shown in FIG. 3 showing an embodiment of the latching device.

FIG. 4 shows an embodiment in which the latching device 24 is integrated into the panel and the panel 40 and frame 38 structures. With reference to FIGS. 2 and 3, the first and second components 20, 22 are attached to a corresponding first surface 30. This allows the latching device 24 to be attached to any corresponding surfaces as well as allowing the latching device 24 to be retrofitted to a door assembly 32. The embodiment as shown in FIG. 4 allows the latching device 24 to be integrated into the design and construction of the panel assembly. The embodiment as shown in FIG. 4 employs the same general principles of the method, system and apparatus as disclosed and discussed with regard to FIGS. 1-3.

It should also be noted that the first and second portions 20, 22 may be reversed relative to the panel 40 and frame 38. In this regard, for example, the first structure 20 as shown in FIG. 3 on the frame 38 could be attached to the panel 40 and the structure 22 attached to the panel 40 could be attached to the frame 38. Regardless of the position of the portions, 20, 22, the general method and function of the latching device 24 will remain the same. In this regard, the objective of the latching device 24 is to retain the panel 40 in a closed position relative to the frame 38 under the general circumstances in which the pressure identified as P1 on the first side 30 of the door is generally equal to the pressure P2 on the second side 36 of the panel. It is expected that a range of equivalent pressure differentials would be permitted to allow some degree of variation in pressure differential between the first side 30 and the second side 36. However, the range would be defined to provide some practical limit whereby the latching device 24 would eventually allow disengagement of the first and second portions 20, 22 to allow the panel 40 to be displaced relative to the frame 38.

For example, if the pressure on the first side 30 is decreased relative to the second side 36 such that P1 is less than P2 and the pressure differential or the difference between P1 and P2 is substantial enough based on the criteria established for the system to justify disengagement of the first and second portions 20, 22, the first and second portions will disengage. Disengagement of the portions will result in opening or disengagement of the panel 40 relative to the frame 38. For example, if P1 is the pressure in a flight deck area and P2 is the pressure in a passenger compartment, a change in the pressures or pressure differential relative to either side of the panel 40 creates a force on one side of the panel. For example, if the pressure in the passenger compartment 19, P2, is reduced a force will be imposed on the panel 40 drawing the panel 40 towards the passenger compartment 19. The latching device 24 resists disengagement of the panel 20 from the frame 38 and as such the panel 40 will not open. However, by operation of the pressure responsive device 26, the mechanism which cooperates with the pressure responsive device 26 will become disengaged allowing the panel 40 to move relative to the frame 38. This operation of the latching device 24 allows the panel 40 to remain closed and latched to prevent unintended, forced or accidental entry, access to or displacement of the panel yet allows the panel to become displaced as a result of disengaging the latching device 24 in response to a pressure differential. This prevents the panel 40 or surrounding structure from becoming damaged or forcibly removed from the frame 38 due to a pressure differential.

As will be described in greater detail as follows, the first and second portions 20, 22 and may be in the form of a latch and keeper or detent and receiver as well as a variety of other mechanical structures. It will also be appreciated by one of ordinary skill in the art, with the aid of this disclosure, that the portions 20, 22 could be in the form of electrical devices which operate mechanisms under the influence of electrical signals. In this regard, the pressure responsive device 26 could operate on an electrical signal in response to an electrical detection of pressure and variations. The signal would be received by a controller which would then operate a related electrical mechanism to move a mechanical device. Alternately, the electrical pressure detection signal could be used to operate an electro-magnet which would then provide the latching function between the first and second portions 20, 22. It should also be noted that the latching device 24 could be positioned at the hinge 50 to prevent movement of the door relative to the frame. However, it will be appreciated that the moment arm 70 created by a force 72 on the panel 40 relative to the hinge 50 may require stronger mechanisms to prevent overriding the latching device 24. With this in mind, it may be desirable to provide the latching device relative to the free-end 42 of the panel 40.

Figure 6:
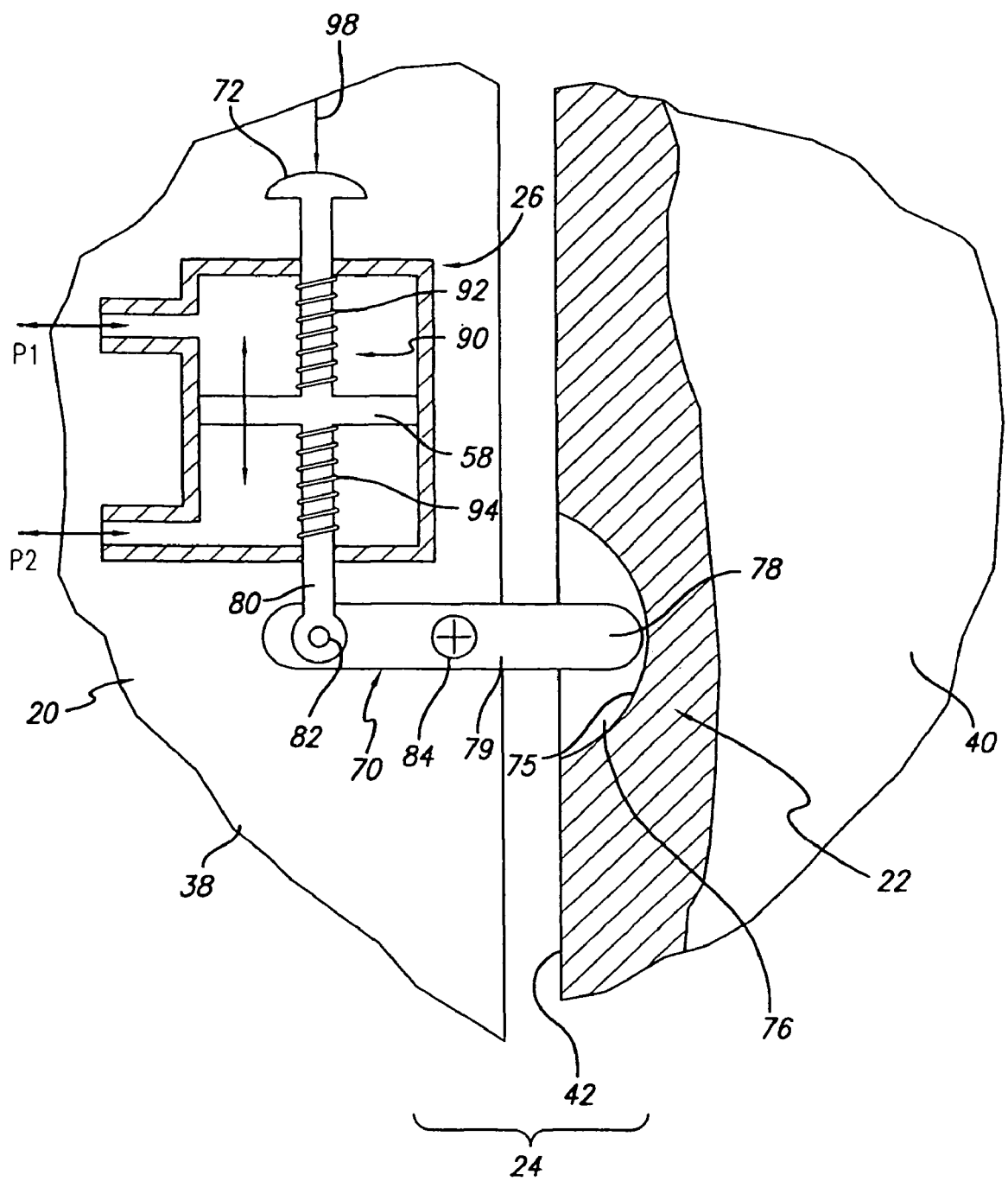
FIG. 6 is a diagrammatic illustration of the latching mechanism.

While it is envisioned that the latching device 24 with the pressure responsive device 26 may be used with a single panel covering a single opening, it is understood that some doors have multiple openings. In this regard, the latching device 24 as shown in FIG. 6 may be employed on each of such multiple panels as necessary. Additionally, the latching device 24 may be adjusted to allow venting of one panel at one pressure differential, a second panel at a second differential, and so on. This staged opening of the panels prevents opening of all the panels upon the development of a single pressure differential. In the event that the pressure differential is minor, one panel may be opened to provide the necessary level of equalization of the pressures. If the opening of a single panel is insufficient over a given period of time and the pressure differential is still maintained or if it increases, a second and subsequent panels may be opened in order to help equalize the pressures in a controlled manner. This staged opening of the panels 40 allows for more controlled pressure venting relative to the multiple panels.

Turning now to a specific embodiment of the present disclosure, the disclosure as shown and described and FIGS. 6-8 will be described.

FIG. 6 shows the latching mechanism 24 in which the first portion 20 includes the pressure sensing device 26 and an associated dead bolt assembly 70. As shown and described, the dead bolt assembly 70 includes a dead bolt arm 78 pivotally retained in the assembly. A manual actuation mechanism in the form of an actuator 72 attached to the plunger 58 allows for manual activation of the dead bolt 70 even when P1 is approximately equal to P2. It will be appreciated that such a manual actuation mechanism may be embodied in many different forms and provide the same or equivalent function. The first portion 20 is shown attached to the frame 38 and the second portion 22 is in the form of a recess or keeper 76 in the door panel 40. A free-end 78 of the dead bolt arm 79 extends from the frame 38 and into the recess 76. The structures and devices described herein may have many different forms. The structures and devices shown and described herein may be represented in a simplified form in the interest of simplifying the description of the disclosure to improve understanding and illustrate the broad scope of this disclosure.

When the pressures P1 and P2 are approximately equal, the dead bolt assembly 70 resists door opening loads on the door panel 40. The system can be designed to resist loads of several thousand pounds. Such a system will involve scaling and designing the first and second portions 20, 22 of sufficient size, dimension and materials so as to resist such loading.

When P1 and P2 are not generally equal as a result of a pressure differential between the first side 30 and second side 36, an arm 80 attached to the piston 58 shifts as a result of the pressure differential. The arm 80 is connected pivotally 82 to the dead bolt 70. It should also be noted that the dead bolt 70 is pivotally connected 84 to the frame 38. As a result of the pressure differentials between P1 and P2, the free-end 78 of the dead bolt 70 rotates relative to the door panel 40. Continued rotation of the free-end 78 relative to the recess 76 under sufficient pressure differential between P1 and P2 results in disengagement of the free-end 78 from the recess 76. As a result, the door panel 40 may be opened without interference from the dead bolt 70.

In the present embodiment, a biasing assembly 90 in the form of a first spring 92 and second spring 94 are provided on either side of the plunger 58 to provide a centering effect. The centering effect as a result of the size and dimension of the arm 80 and attachment to the dead bolt 70 helps to maintain the dead bolt in a generally centered position in the recess 76.

The manual actuator 72 is provided to manually displace the dead bolt 70 by applying a force 98 to the actuator 72.

As can been seen from FIG. 6, pushing downwardly 98 on the actuator 72 causes the arm 80 to push downwardly on the pivotally 82 connected dead bolt 70 thereby rotating the dead bolt 70 about pivot point 84 disengaging the free-end 78 from the recess 76. It is envisioned that one of ordinary skill in the art, informed by the teachings of the present disclosure, could develop a configuration of the actuator 72 to facilitate manual movement of the dead bolt 79 by lifting up on the actuator 72. This embodiment is considered to be within the scope of this disclosure.

Figure 7:
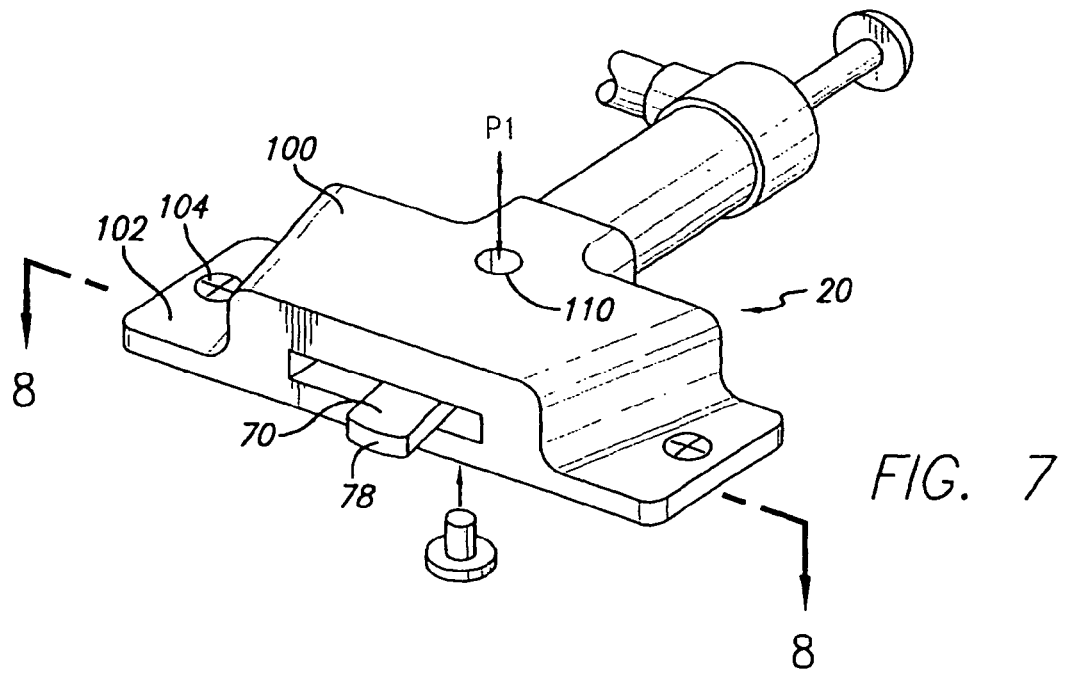
FIG. 7 is a perspective view of an embodiment of the diagrammatic latching mechanism shown in FIG. 5.
Figure 8:
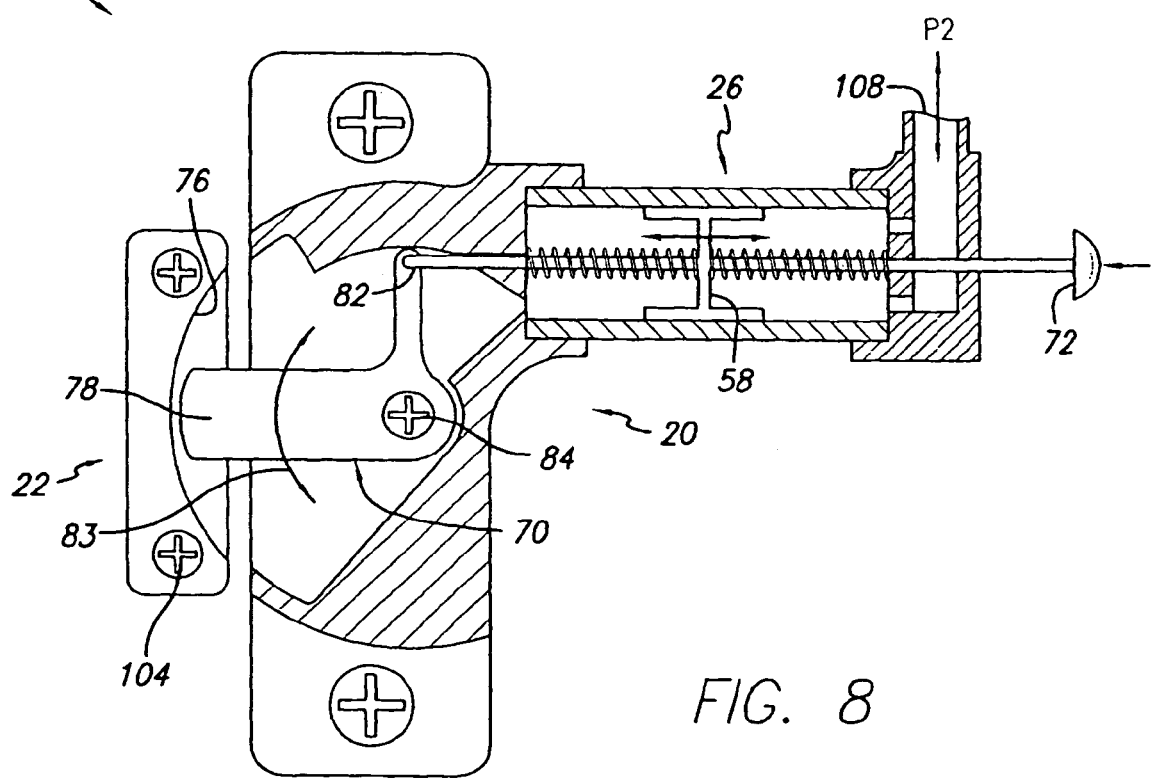
FIG. 8 is a partial fragmentary cross-sectional view taken along line 8-8 in FIG. 7.

It should be noted that the embodiments as shown FIGS. 7 and 8 provide the ability to attach the latching mechanism to the surfaces of the door assembly 32, build the latching mechanism into the panel assembly structure as well as, retrofit the latching mechanism 24 to existing panel assemblies 32. For example, the structure 20 includes a housing 100 integrally formed as a single piece body. A flange 102 extending from the housing 100 allows for fasteners 104 to be attached thereto thereby fastening the integral housing 100 to the corresponding surface. Similarly, the second structure 22 is integrally formed with flanges for attaching fasteners 104 to facilitate attachment to a corresponding surface. The embodiment as shown in FIGS. 7 and 8 also include the pressure sensitive device 26. A vent tube 108 is provided to provide pressure venting of the pressure sensitive device 26 to the second side 36. A hole 110 in the housing 100 vents pressure to the first side 30. The manual actuator 72 extends from the portion of the sensing device 26 and connects to the dead bolt 70.

The latching mechanism of FIG. 7 is shown in a perspective view which has been cross-sectioned in FIG. 8. Shown in FIG. 8, the dead bolt 70 rotates 83 about point 84. While the orientation of the pressure sensing device 26 is changed in this embodiment relative to that as shown in FIG. 4, general operation is still approximately the same as that as shown in FIG. 6.

In use, the dead bolt latching mechanism 24 as shown in FIGS. 6-8 is attached to or integrated in the panel assembly 32. The dead bolt 70 engages a corresponding recess 75 defined by a keeper 76 to prevent disengagement of the door from the frame. The dead bolt latching mechanism 24 includes a pressure sensing device 26 which is coupled or, as described above, otherwise operatively connected to the dead bolt 70 to operate the dead bolt 70 or otherwise have an effect on the dead bolt 70, in response to the pressure sensed by the pressure sensing device 26. If the pressure, P2 drops relative to the pressure P1, the dead bolt 70 will rotate about 84 to disengage the free-end 78 of the dead bolt from the keeper 76. Similarly, if the pressure P1 decreases relative to the pressure P2, the plunger 58 will be moved and the dead bolt 70 will be rotated out of engagement with the keeper 76 recess 75. Also, a manual actuator 72 is provided to manually disengage the dead bolt 70 from the keeper 76 regardless of the pressures P1, P2. Also, if the pressure P2 is less than the pressure P1, which would ordinarily disengage the dead bolt from the keeper 76, but for some reason does not operate properly, the manual actuator 72 can be used to disengage the dead bolt 70 from the keeper 76.

Turning now to a specific embodiment of the disclosure as shown and described and FIGS. 9-18 will be described.

Figure 10:
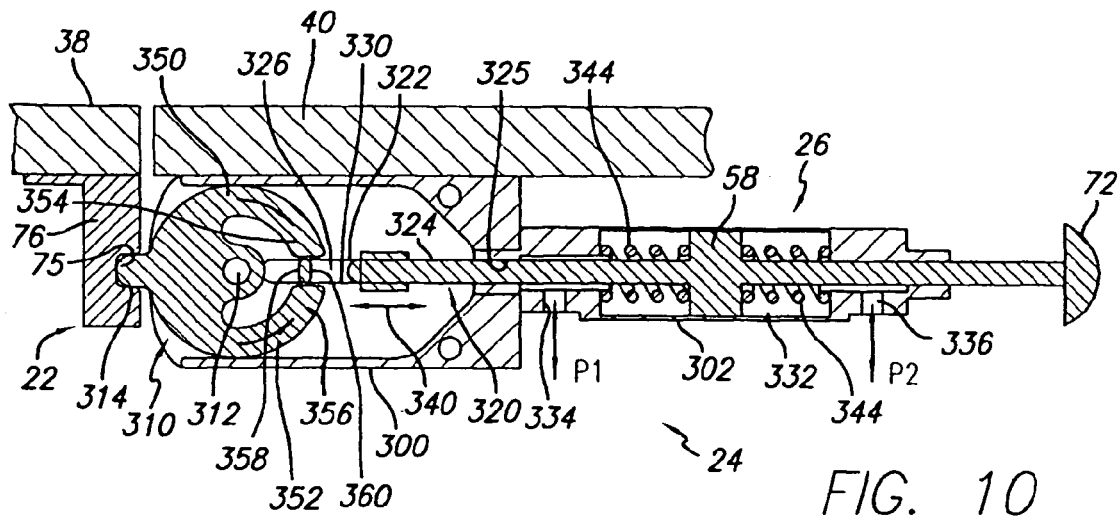
FIG. 10 is a cross-sectional, side elevational view of the latching mechanism in FIG. 9 taken along line 10-10 in FIG. 9.
Figure 9:
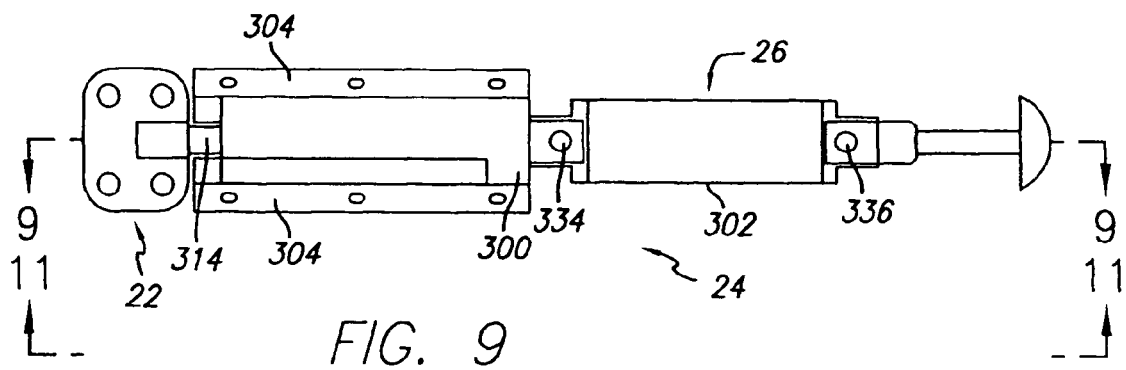
FIG. 9 is a top plan view of an embodiment of the latching mechanism.
Figure 11:
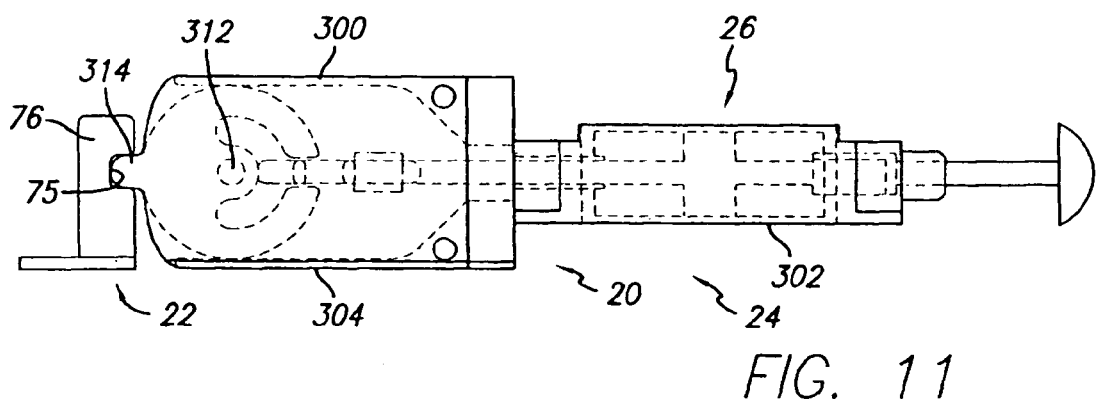
FIG. 11 is a side elevational view of the latching mechanism shown in FIG. 9, taken along line 11-11 in FIG. 9.

The dead bolt latching mechanism 24 shown in FIGS. 9-11 includes the first portion 20 and the second portion 22. The first portion 20 includes housing 300 and the pressure sensing device 26 in the form of an air cylinder 302. Flanges 304 are provided on the housing 300 to attach the dead bolt latching mechanism 24 to a door panel 40. The dead bolt latching mechanism 24 includes a rotating bolt 310 rotatably retained in the housing by a pin 312. The bolt 310 includes a protrusion 314 which engages a corresponding recess 75 of the keeper 76 of the second portion 22. The second portion 22 provides a keeper 76, which, when engaged with the protrusion 314, prevents the latching mechanism 24 from being disengaged. Rotation of the rotatable bolt 310 is controlled as a result of the position of a lock assembly 320. The lock assembly 320 includes a ring portion 322 attached to a shaft 324. The shaft 324 is retained in an axial passage 325 extending through the housing 300 and the air cylinder 302 for axial movement there through. The shaft 324 moves relative to the bolt 310 upon movement of the piston 58 in response to the air pressure P1 and P2. With further reference to FIG. 12, the ring portion 322 defines a passage 326 there through. Additionally, in the embodiment shown in FIG. 12, the ring 322 extends outwardly from the shaft 324 to engage passages 330 formed on the inside surface of the housing 300. This allows for controlled movement of the ring 322 relative to the bolt 310.

The shaft 324 is connected to the piston or plunger 58 which is retained inside the cavity 332 of the air cylinder 302. The air cylinder communicates with separate areas through passages 334 and 336. For example, 334 communicates with the flight deck whereas passage 336 may be used to communicate with the passenger compartment. As such, in the present embodiment, the pressures P1 and P2 can act on the piston 58 retained within the cylinder 302. Changes in the pressures P1, P2 will cause the piston 58 to shift within the cylinder 302 thereby causing movement 340 of the lock 320.

Springs 344 are provided on either side of the piston 58 to balance the piston generally equally in the cylinder 302. The springs also provide a force which generally resist aberrant movement of the piston 58 due to minor momentary pressure changes. Further, a manual actuator 72 is provided and attached to the shaft 324 for manually overriding the normally latched condition of the bolt 310 in the keeper 76.

Turning now to FIGS. 12-18, a description of the operation and method of the present dead bolt latching mechanism 24 will be described. FIG. 12 is a perspective view showing the bolt 310 in a locked position with the lock 320 generally preventing movement of the bolt 310. With further reference to FIG. 10, the bolt 310 includes a pair of spaced arcuate arms 350, 352. Acruate arms 350, 352 have free-ends 354, 356 which define a gap 358 there between. A leading edge 360 of the lock is positioned in the space 358 to prevent rotation of the bolt. As shown in FIG. 13, the panel to which the housing 300 is attached is rotated or moved slightly. Movement of the housing 300 imposes a force on the bolt 310 which might slightly rotate the bolt 310 as a result of the protrusion 314 being retained in the keeper 76. However, because the leading edge 360 is positioned in the gap 358, the bolt 310 is prevented from rotating. As such, the bolt 310 cannot be rotated when the lead edge 360 is positioned in the gap 358 and as a result the protrusion 314 is retained in the keeper 76.

Figure 15:
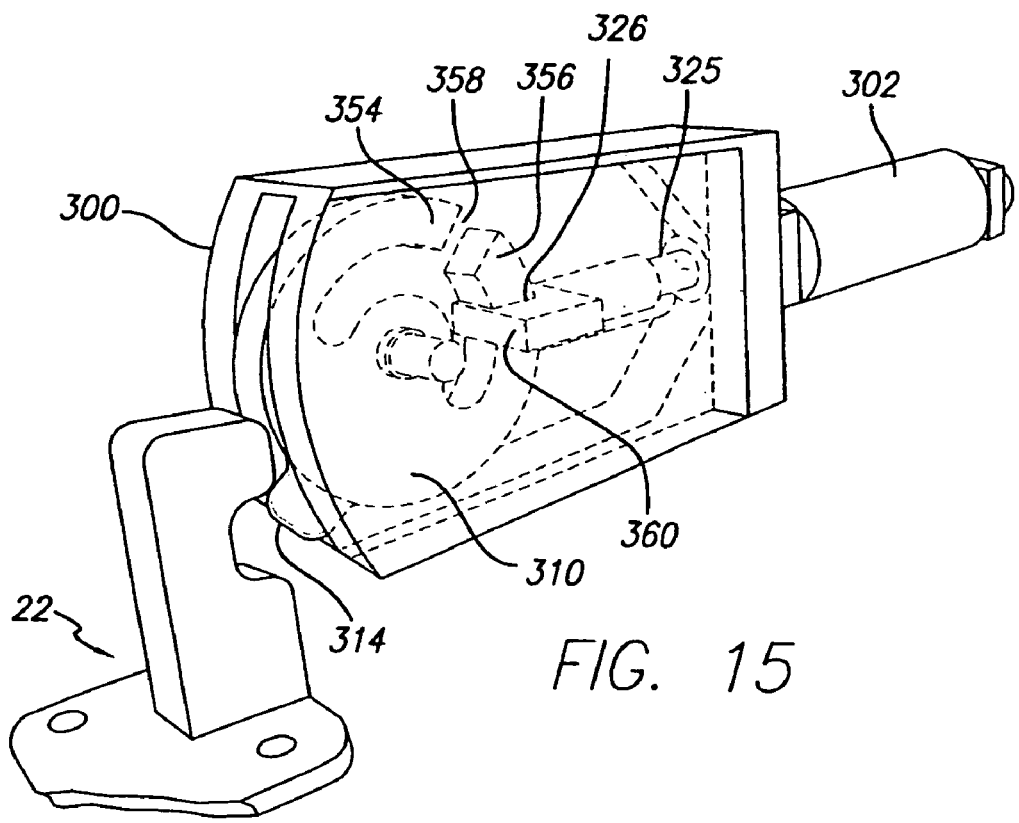
Figure 16:
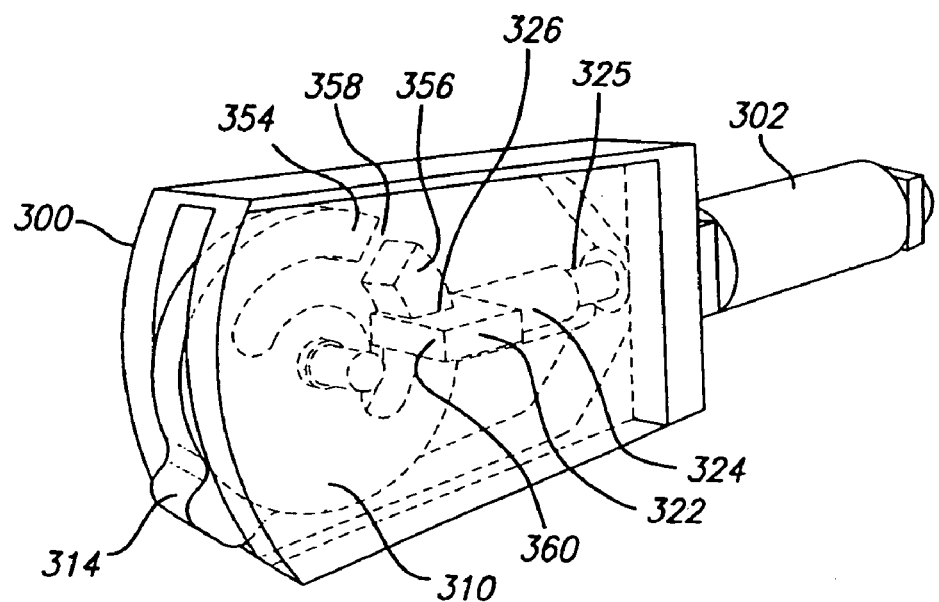

In FIG. 14, the lock 320 has been moved forwardly due to either actuation by the manual actuator 72 or a differential in pressures P1, P2. For example, if P1 decreases, the resulting differential will be a relative increase in P2. The relative increase in P2 will cause the piston 58 to shift towards the bolt 310 resulting in movement of the bolt 310 so that the free-ends 354, 356 of the bolt 310 will be allowed to pass through the gap 326, the ring 322. The continued movement of the panel to which the housing 300 is attached causes the continued rotation of the bolt 310 as a result of the protrusion 314 being driven against the keeper 76. In other words, as the panel is moved, the protrusion 314 will be acted on by the keeper 76 remaining in a fixed position and as a result causing a rotation of the bolt 310. Continued rotation of bolt 310 is shown in FIGS. 15 and 16 such that the arm 352 is rotated substantially through the passage 326.

Figure 17:
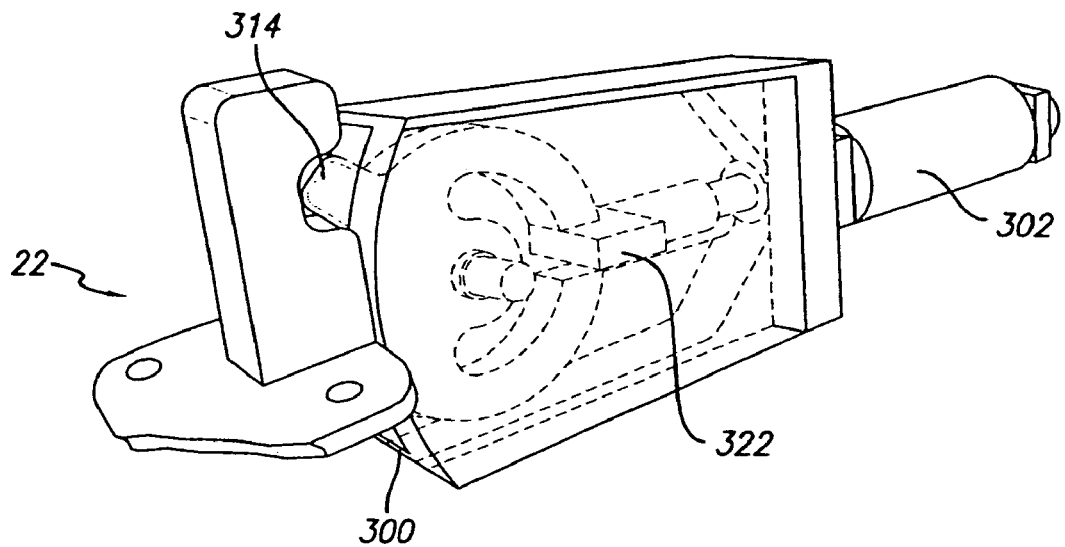
Figure 18:
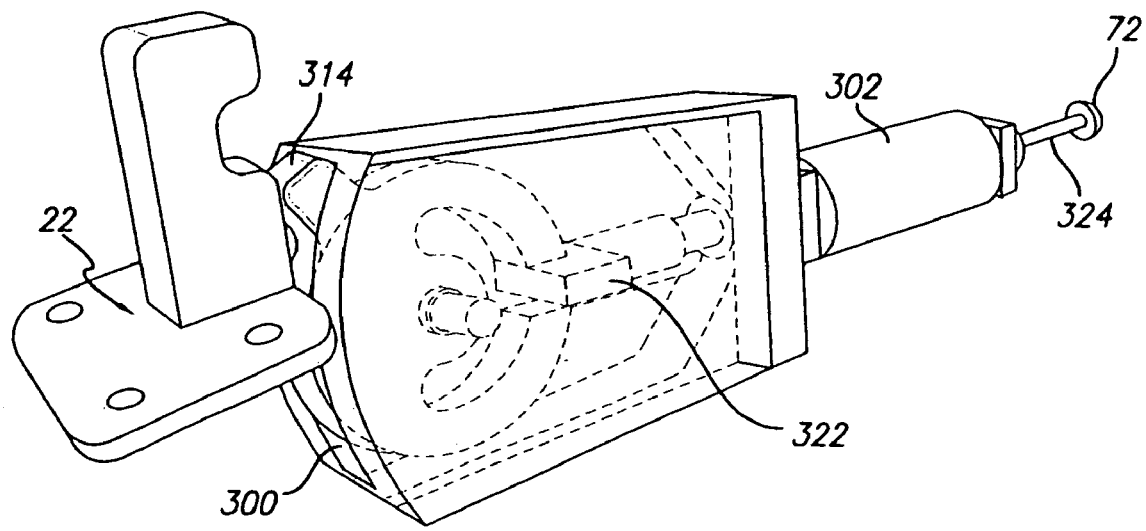

In a similar manner, the bolt 310 is shown to be rotated in FIGS. 17 and 18 in response to a retraction of the lock away from the bolt 310. Retraction of the lock is caused by a differential in pressures P1, P2. For example, when P2 is decreased, the relative effect will be increase P1, thereby causing the plunger 58 to shift away from the old 310. Similar to the description of the interaction between the protrusion 314 and keeper 22 as provided above, the bolt 310 will rotate since the leading edge 360 of the lock 320 no longer interferes with free rotation of the bolt. In this manner, once the lock is withdrawn away from the bolt 310, the free-end 354 of the arm 350 is allowed to pass in front of the leading edge 360.

The extending arms 350, 352 of the bolt 310 allow the bolt to be a symmetric design which facilitates operation of the bolt in both directions of swing of the door 40. The symmetric design allows for manual actuation of the latching mechanism by use of the manual actuator 72 and swinging of the door 40 in either direction. It should be noted that with reference FIG. 10, manual actuation requires that the arms 350, 352 be allowed to pass through the gap 326 in the lock 320. As such, interaction of the protrusion and keeper 76 will allow the door to open in either direction.

While a preferred embodiment of the disclosure is shown and described, it is envisioned that those skilled in the art may devise various modifications and equivalents without departing from the spirit and scope of the disclosure as recited in the following claims.

The invention claimed is:

1. A dead bolt latching device for displaceably retaining a panel relative to a frame, the dead bolt latching device comprising:
    a latch body attachable to at least one of a panel and a frame;
    a dead bolt assembly displaceably carried on the latch body;
    a portion of the dead bolt assembly abutting a portion of the other of a panel and a frame for preventing displacement of a panel from a frame;
    a pressure responsive device for detecting an air pressure differential, said pressure responsive device including a pressure sensing device operative to generate an electrical signal upon detection of an air pressure differential and a moving device coupled to the pressure sensing device, said moving device being operably moveable under said electrical signal; and
    the pressure responsive device being coupled with the dead bolt assembly for responsively operating the dead bolt assembly in response to an air pressure differential to allow relative movement between a panel and a frame.

2. The dead bolt latching device of claim 1, wherein the dead bolt assembly includes a dead bolt which is pivotably retained relative to the latch body.

3. The dead bolt latching device of claim 1, wherein the pressure responsive device is carried on the latch body.

4. The dead bolt latching device of claim 1, wherein the pressure responsive sensing device includes means for detecting a first pressure and means for detecting a second pressure, the pressure responsive device operating in response to a differential between the first pressure and the second pressure.

5. The dead bolt latching device of claim 1, wherein the pressure responsive sensing device includes a pressure responsive diaphragm operatively retained in a pressure responsive chamber the chamber including a first opening communicating with a first volume and a second opening communicating with a second volume, a pressure differential between the first volume and second volume acting on the pressure responsive diaphragm in the chamber.

6. The dead bolt latching device of claim 1, where in the pressure responsive sensing device includes a pneumatic piston, operatively retained in a piston chamber, the chamber including a first opening communicating with a first volume and a second opening communicating with a second volume, a pressure differential between the first volume and second volume operating the piston in the chamber.

7. A dead bolt latching device for displaceably retaining a panel relative to a frame, the dead bolt latching device comprising:
    a latch body attachable to at least one of a panel and a frame;
    a dead bolt pivotably carried on the latch body;
    a portion of the dead bolt extendable from the latch body for abutting a portion of the other of a panel and a frame to prevent displacement of a panel from a frame; and
    a pressure responsive device responsive to at least one of a pressure differential between two sides of a panel and a decrease in pressure on one side of a panel, said pressure responsive device including a pressure sensing device operative to generate an electrical signal upon detection of an air pressure differential and a moving device coupled to the pressure sensing device, said moving device being operably moveable under said electrical signal to allow relative movement between a panel and a frame.

8. The dead bolt latching device of claim 7, wherein the pressure responsive sensing device includes means for detecting a first pressure and means for detecting a second pressure, the pressure responsive device operating in response to a differential between the first pressure and the second pressure.

9. The dead bolt latching device of claim 7, wherein the pressure responsive device is carried on the latch body.

10. The dead bolt latching device of claim 7, where in the pressure responsive sensing device includes a pneumatic piston operatively retained in a piston chamber, the chamber including a first opening communicating with a first volume and a second opening communicating with a second volume, a pressure differential between the first volume and second volume operating the piston in the chamber.

11. The dead bolt latching device of claim 7, where in the pressure responsive sensing device includes a pressure responsive diaphragm operatively retained in a pressure responsive chamber, the chamber including a first opening communicating with a first volume and a second opening communicating with a second volume, a pressure differential between the first volume and second volume acting on the pressure responsive diaphragm in the chamber.

12. The dead bolt latching device of claim 7, wherein the pressure responsive sensing device includes an electrical pressure sensing device and a moving device coupled to the electrical pressure sensing device, the electrical pressure sensing device communicating with a first volume having a first pressure and a second volume having a second pressure.

13. A dead bolt latching system for displaceably retaining a plurality of panels relative to a frame, the dead bolt latching system comprising:

at least one dead bolt latching device operatively associated with each of the plurality of the panels, the dead bolt latching device retaining the corresponding panel in position relative to the frame;

a dead bolt displaceably carried on the dead bolt latching device, the dead bolt being operatively associated with the corresponding panel;

each of the dead bolt latching devices including at least one pressure responsive device operatively coupled to the corresponding dead bolt, said pressure responsive device including a pressure sensing device operative to generate an electrical signal upon detection of an air pressure differential and a moving device coupled to the pressure sensing device, said moving device being operably moveable under said electrical signal; and the pressure responsive device responding to a pressure detection and disengaging the dead bolt from the panel upon the development of a predetermined degree of pressure.

14. The dead bolt latching device of claim 13, wherein the pressure responsive device is carried on the latch body.

15. The dead bolt latching device of claim 13, wherein the pressure responsive device is separate from the latch body.

16. The dead bolt latching device of claim 13, wherein the pressure responsive sensing device includes a pressure responsive diaphragm, operatively retained in a pressure responsive chamber, the chamber including a first opening communicating with a first volume and a second opening communicating with a second volume, a pressure differential between the first volume and second volume acting on the pressure responsive diaphragm in the chamber.

17. The dead bolt latching system of claim 13, wherein the pressure responsive sensing device includes means for detecting a first pressure and means for detecting a second pressure, the pressure responsive device operating in response to a differential between the first pressure and the second pressure.

18. The dead bolt latching device of claim 13, where in the pressure responsive sensing device includes a pneumatic piston, operatively retained in a piston chamber, the chamber including a first opening communicating with a first volume and a second opening communicating with a second volume, a pressure differential between the first volume and second volume operating the piston in the chamber.

19. The dead bolt latching system of claim 13, wherein the pressure responsive sensing device includes an electrical pressure sensing device and a moving device coupled to the electrical pressure sensing device, the electrical pressure sensing device communicating with a first volume having a first pressure and a second volume having a second pressure.

20. The dead bolt latching system of claim 13, wherein each pressure responsive device includes means for detecting a first pressure and means for detecting a second pressure, each pressure responsive device operating in response to a differential between the first pressure and the second pressure, the degree of pressure differential being different for each pressure responsive device.

21. A dead bolt latch mechanism for releasably retaining a first structure relative to a second structure, the latch mechanism comprising:

a latch body attachable to at least one of a first structure and a second structure;

a dead bolt assembly displaceably carried on said latch body, said dead bolt assembly including a dead bolt;

a portion of the dead bolt abutting a portion of the other of the first structure and the second structure for preventing displacement of the first structure from the second structure under a predetermined range of force loads;

a pressure responsive device for detecting an air pressure, said pressure responsive device including a pressure sensing device operative to generate an electrical signal upon detection of an air pressure differential and a moving device coupled to the pressure sensing device, said moving device being operably moveable under said electrical signal to allow relative movement between a panel and a frame;

a dead bolt engaging member operatively connected to the moving device and moveably displaceable relative to the dead bolt in response to operation of the pressure responsive device; and a receiving formation on the dead bolt assembly for mechanically engaging a portion of the bolt engaging member to prevent displaceable movement of the dead bolt prior to operation of the pressure responsive device.

22. The dead bolt latch mechanism of claim 21, wherein the dead bolt is pivotably mounted.

23. The dead bolt latch mechanism of claim 21, wherein said pressure sensing device includes a moveable element having a first surface and a second surface, the first surface communicating with a first air pressure and the second surface communicating with a second air pressure, the moveable element being displaceable by a pressure difference between the first air pressure and the second air pressure causing movement of the moveable element to controllably.

24. The dead bolt latch mechanism of claim 21, wherein said pressure sensing device includes a piston operatively retained in a pressure responsive chamber, the pressure responsive chamber including a first opening communicating with a first air pressure and a second opening communicating with a second air pressure.

25. The dead bolt latch mechanism of claim 21, wherein said pressure sensing device includes an electrical pressure sensing device operable to generate an electrical signal upon detection of a pressure differential, said moving device further including an electrical device operable under said signal to move the dead bolt engaging member from a first position to a second position.

26. The dead bolt latch mechanism of claim 21, wherein the dead bolt engaging member is axially moveable between a first position preventing displaceable movement of the dead bolt and a second position allowing displaceable movement of the dead bolt, said dead bolt engaging member being moveable in response to the pressure responsive device.

27. The dead bolt latch mechanism of claim 21 including a biasing element urging the dead bolt engaging member into a desired position, said biasing element having a desired minimal biasing force resisting movement.

28. A dead bolt latching assembly for releasably retaining a panel relative to a frame, the dead bolt latching assembly comprising:

a dead bolt latch body;

a dead bolt pivotably carried on said dead bolt latch body;

a portion of the dead bolt adapted to for placement in an abutting position with a portion of the other of the panel and the frame to prevent displacement of the panel relative to the frame;

a dead bolt engaging member extending through a passage in said latch body, the dead bolt engaging member being axially moveable from a first position to a second position, said first position aligning the portion of the dead bolt in an abutting position preventing relative movement between the panel and the frame, said second position allowing said portion of the dead bolt to be aligned in a non-abutting position thereby allowing relative movement between the panel and the frame; and at least one pressure responsive device coupled to said dead bolt engaging member and operative to detect an air pressure differential, said pressure responsive device including a pressure sensing device operative to generate an electrical signal upon detection of an air pressure differential and a moving device coupled to the pressure sensing device, said moving device being operably moveable under said electrical signal to moveably displace said dead bolt engaging member to allow relative movement between the panel and the frame.

29. The dead bolt latch mechanism of claim 28, wherein said pressure sensing device includes an electrical pressure sensing device operable to generate an electrical signal upon detection of the air pressure differential, said moving device further including an electrical device operable under said signal to move the dead bolt engaging member from a first position to a second position.

30. A method for controllably latching a panel relative to a frame, the latching method being responsive to an air pressure differential, the method comprising the steps of:

providing a dead bolt latch assembly operatively associated with a panel and a frame, the dead bolt latch assembly including a pivotable dead bolt operatively associated with at least one of a panel and a frame;

providing at least one pressure responsive device operatively coupled to the bolt to maintain the position of the dead bolt relative to the panel under a first pressure level and to allow rotational movement of the dead bolt under a second pressure level, the pressure responsive device adapted to detect a change in air pressure and being operable under predetermined levels of air pressure, said pressure responsive device including a pressure sensing device operative to generate an electrical signal upon detection of an air pressure differential and a moving device coupled to the pressure sensing device, said moving device being operably moveable under said electrical signal;

engaging the at least one of the panel and the frame with the dead bolt;

retaining the bolt in operative engagement with the at least one of the panel and the frame thereby preventing displacement of the panel from the frame under mechanical forces on a surface of the panel;

detecting an air pressure reaching a predetermined pressure level;

operating the pressure responsive device in response to the detected air pressure; and operating the moving device to disengage the dead bolt from the at least one of the panel and the frame upon development of a predetermined degree or pressure thereby allowing relative movement between the panel and the frame.

31. The method of claim 30, wherein the step of detecting an air pressure comprises electrically sensing the pressure differential.

32. The method of claim 30, wherein the pressure sensing device comprises a pneumatic piston.

33. A dead bolt latching mechanism for retaining a panel relative to a frame under physical loads and providing relative movement between a panel and a frame under predetermined air pressure levels, the dead bolt latching mechanism comprising:

a latch body attachable to at least one of a panel and a frame;

a dead bolt displaceably carried on said latch body, said dead bolt rotatable about a pivot point, said dead bolt having a free end adapted to be positioned in an abutting engagement with the other of a panel and a frame to prevent displacement of a panel relative to a frame;

a dead bolt stop element axially moveable through a passage in said latch body, said dead bolt stop element moveable between a first position preventing rotation of said dead bolt to retain the free end in a position of abutment with the other of a panel and a frame to prevent displacement of a panel relative to a frame and a second position allowing the displaceable movement of the dead bolt to a non-abutting position with the other of a panel and a frame to allow displacement of a panel relative to a frame;

a pressure responsive device for detecting an air pressure level, said pressure responsive device coupled to the dead bolt stop element and operable to axially move said dead bolt stop element between said first and second positions upon a detection of a pre-determined air pressure level, said pressure responsive device including a pressure sensing device operative to generate an electrical signal upon detection of an air pressure differential and a moving device coupled to the pressure sensing device, said moving device being operably moveable under said electrical signal.

34. The dead bolt latching mechanism of claim 33, wherein said pressure responsive device includes a pressure sensor operable to generate and electrical signal upon detection of a pressure level, said pressure responsive device further including a signal-responsive device operable to moveably displace the dead bolt stop element.

35. A dead bolt latching device for displaceably retaining a panel relative to a frame, the latching device comprising:

a latch housing attachable to at least one of a panel and a frame;

a bolt pivotably carried on the latch housing;

a portion of the bolt extending from the latch housing for abutting a portion of the other of a panel and a frame to prevent displacement of a panel from a frame;

an electrical pressure responsive device operable in responsive to a detection of pressure; a bolt shaft movable from a first position contacting said bolt and a second position of non-contact with said bolt, said bolt shaft being connected to the pressure responsive device and being axially displaceable in response to the pressure responsive device between a first position preventing pivotable movement of the bolt and a second position allowing pivotable movement of the bolt;

a portion of the housing defining a passage, the bolt shaft extending axially through the passage; and a structure on the bolt adapted to mechanically contact at least a portion of the bolt shaft to restrict pivotable movement of the bolt when the bolt shaft is in the first position, wherein the dead bolt latching device prevents forcible displacement of a panel relative to a frame from at least one side of a panel when the bolt is positioned in the first position and allows displacement when in the second position.

36. A pressure responsive latching system for releasably retaining a panel relative to a frame, the latching system comprising:
- a latch body attachable to at least one of a panel and a frame, the latch body including a passageway defined therein;
- a rotatable dead bolt retained on the latch body, the rotatable dead bolt having a pivot point generally defining a pivot axis, the bolt having a leading edge spaced from the pivot point for abutting contact with the other of a panel and a frame for preventing displacement of a panel relative to a frame;
- an electrical pressure responsive device retained on the housing, the pressure responsive device being operable on an electrical signal in response to a detection of a pressure to cause mechanical movement;
- a shaft connected to the pressure responsive device and extending through the passageway, the shaft being displaceable in response to the pressure responsive device between a first position mechanically restricting rotation of the bolt and a second position allowing rotation of the bolt;
- a shaft contact area on the bolt for mechanically abutting the shaft when the shaft is located in the first position to prevent rotation of the bolt;
- a pressure detector coupled to the electrical pressure responsive device that generates the electrical signal,
- wherein the dead bolt latching device prevents forcible displacement of a panel relative to a frame from at least one side of a panel when the bolt is positioned in the first position and allows forcible displacement when the bolt is positioned in the second position.

37. A latching system operable in response to a pressure change, the latch system comprising:
- a frame structure having a first portion and a second portion;
- a panel having a first side and an opposed second side, the panel including a free end and a movably retained second end;
- a retaining structure that attaches the movably retained second end to the second portion of the frame structure;
- a latching mechanism to retain the panel in a closed position relative to the frame structure, the latching mechanism including a latch body attachable to one of the panel and the frame structure, a portion of the latch body defining a passage;
- a bolt carried on the latch body and pivotable about a pivot axis, a portion of the bolt for abutting a portion of the other of the panel and the frame structure;
- a pressure sensing device operable to detect a pressure and generate an electrical signal;
- a pressure responsive device operable upon receipt of a control signal;
- a controller to receive the electrical signal and communicate the control signal to the pressure responsive device to operate the pressure responsive device; and
- a bolt shaft coupled to the pressure responsive device and positioned to extend through the passage, the bolt shaft being displaceable upon operation of the pressure responsive device between a first position limiting pivotable motion of the bolt and a second position allowing pivotable motion of the bolt.

38. A method for controllably latching a panel relative to a frame, the latching method being responsive to a pressure detected to disengage a dead bolt from the panel upon the development of a predetermined degree of pressure, the method comprising the steps of:
- providing a dead bolt latching device operatively associated with a panel;
- providing a dead bolt displaceably carried on the dead bolt latching device, the dead bolt being operatively associated with a panel;
- providing a pressure responsive device operatively coupled to the dead bolt, said pressure responsive device including a pressure sensing device operative to generate an electrical signal upon detection of an air pressure and a moving device coupled to the pressure sensing device, said moving device being operably moveable under said electrical signal;
- engaging the dead bolt with a panel;
- retaining the dead bolt in engagement with a panel;
- detecting a pressure;
- operating the pressure responsive device in response to the pressure according to a predetermined pressure level;
- disengaging the dead bolt from a panel upon development of the predetermined pressure level; and
- displacing a panel relative to a frame upon disengagement of the dead bolt on a panel.

* * * * *